US012640919B1

(12) United States Patent
Sinha et al.

(10) Patent No.: US 12,640,919 B1
(45) Date of Patent: May 26, 2026

(54) FACILITATING ESTABLISHMENT OF A SECURITY ASSOCIATION WHEN A POST-QUANTUM PRESHARED KEY CANNOT BE OBTAINED

(71) Applicant: Juniper Networks, Inc., Sunnyvale, CA (US)

(72) Inventors: Ranjan Sinha, Bangalore (IN); Priyabrata Saha, Kolkata (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 88 days.

(21) Appl. No.: 18/654,406

(22) Filed: May 3, 2024

(51) Int. Cl.
*H04L 9/40* (2022.01)
*H04L 9/08* (2006.01)

(52) U.S. Cl.
CPC .......... *H04L 9/0858* (2013.01); *H04L 9/0825* (2013.01)

(58) Field of Classification Search
CPC ............................ H04L 9/0858; H04L 9/0825
See application file for complete search history.

(56) References Cited

U.S. PATENT DOCUMENTS

| | | | |
|---|---|---|---|
| 2012/0203879 A1* | 8/2012 | Merino Vazquez | ........................ H04L 65/1016 709/223 |
| 2024/0129115 A1* | 4/2024 | Ren | ........................ H04L 9/0869 |
| 2025/0175795 A1* | 5/2025 | Inamdar | .............. H04W 12/069 |

* cited by examiner

*Primary Examiner* — Thaddeus J Plecha
(74) *Attorney, Agent, or Firm* — Harrity & Harrity, LLP

(57) ABSTRACT

A network device may determine that a particular security association (SA) is to be established with a peer network device and that a post-quantum preshared key (PPK) cannot be obtained by the network device. The network device may determine that establishment of quantum-secure SAs is not mandatory for the network device. The network device may generate based on determining that the PPK cannot be obtained by the network device, and based on determining that establishment of quantum-secure SAs is not mandatory for the network device, a pseudo-PPK, and may generate, using the pseudo-PPK, pseudo-PPK authentication information associated with the network device. The network device may generate, using a non-quantum-secure key, non-quantum-secure authentication information associated with the network device. The network device may generate an authentication message that includes the pseudo-PPK authentication information and the non-quantum-secure authentication information, and may send the authentication message to the peer network device.

20 Claims, 8 Drawing Sheets

500

510 — Determine that a particular SA is to be established with a peer network device 520 — Determine that a PPK cannot be obtained by the network device 530 — Determine that establishment of quantum-secure SAs is not mandatory for the network device 540 — Generate a pseudo-PPK and a pseudo-PPK identifier 550 — Generate, using the pseudo-PPK, pseudo-PPK authentication information associated with the network device 560 — Generate, using a non-quantum-secure key, non-quantum-secure authentication information associated with the network device 570 — Generate an authentication message that includes the pseudo-PPK identifier, the pseudo-PPK authentication information, and the non-quantum-secure authentication information 580 — Send the authentication message to the peer network device

100

Second
Network
Device

First
Network
Device

110
Generate a pseudo-PPK
and a pseudo-PPK
identifier
112
Generate pseudo-PPK
authentication
information
114
Generate non-quantum-
secure authentication
information

100

First Network Device

116
Generate an authentication message

118
Send the authentication message

Second Network Device

120
Authenticate the first network device

200

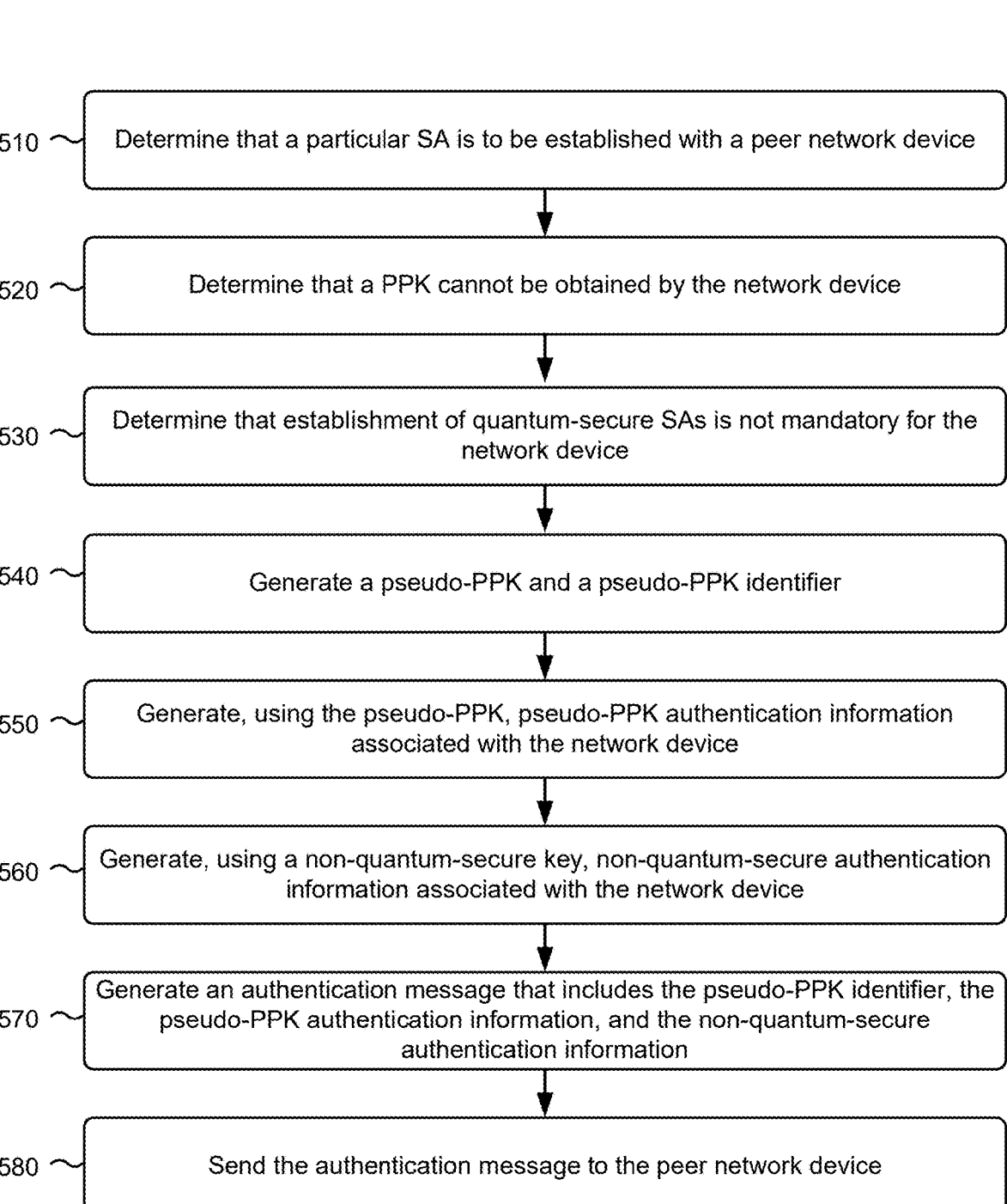

500

510 — Determine that a particular SA is to be established with a peer network device 520 — Determine that a PPK cannot be obtained by the network device 530 — Determine that establishment of quantum-secure SAs is not mandatory for the network device 540 — Generate a pseudo-PPK and a pseudo-PPK identifier 550 — Generate, using the pseudo-PPK, pseudo-PPK authentication information associated with the network device 560 — Generate, using a non-quantum-secure key, non-quantum-secure authentication information associated with the network device 570 — Generate an authentication message that includes the pseudo-PPK identifier, the pseudo-PPK authentication information, and the non-quantum-secure authentication information 580 — Send the authentication message to the peer network device

FIG. 5

FACILITATING ESTABLISHMENT OF A SECURITY ASSOCIATION WHEN A POST-QUANTUM PRESHARED KEY CANNOT BE OBTAINED

BACKGROUND

Internet Key Exchange version 2 (IKEv2) is a protocol used for setting up secure communication channels, such as security associations (SAs), between network devices. It facilitates the negotiation of security parameters and the establishment of cryptographic keys between the network devices.

SUMMARY

In some implementations, a method includes determining, by a network device, that a particular security association (SA) is to be established with a peer network device; determining, by the network device and based on determining that the particular SA is to be established, that a post-quantum preshared key (PPK) cannot be obtained by the network device; determining, by the network device, that establishment of quantum-secure SAs is not mandatory for the network device; generating, by the network device, based on determining that the PPK cannot be obtained by the network device, and based on determining that establishment of quantum-secure SAs is not mandatory for the network device, a pseudo-PPK and a pseudo-PPK identifier; generating, by the network device and using the pseudo-PPK, pseudo-PPK authentication information associated with the network device; generating, by the network device and using a non-quantum-secure key, non-quantum-secure authentication information associated with the network device; generating, by the network device, an authentication message that includes the pseudo-PPK identifier, the pseudo-PPK authentication information, and the non-quantum-secure authentication information; and sending, by the network device, the authentication message to the peer network device.

In some implementations, a non-transitory computer-readable medium storing a set of instructions includes one or more instructions that, when executed by one or more processors of a network device, cause the network device to: determine that establishment of quantum-secure SAs is not mandatory for the network device; determine, based on determining particular SA is to be established with a peer network device, that a PPK cannot be obtained by the network device; generate, based on determining that the PPK cannot be obtained by the network device, and based on determining that establishment of quantum-secures SAs is not mandatory for the network device, a pseudo-PPK and a pseudo-PPK identifier; generate, using the pseudo-PPK, pseudo-PPK authentication information associated with the network device; generate, using a non-quantum-secure key, non-quantum-secure authentication information associated with the network device; and send, to the peer network device, an authentication message that includes the pseudo-PPK identifier, the pseudo-PPK authentication information, and the non-quantum-secure authentication information.

In some implementations, a network device includes one or more memories; and one or more processors to: determine that a PPK cannot be obtained by the network device; generate, based on determining that the PPK cannot be obtained by the network device, a pseudo-PPK; generate, using the pseudo-PPK, pseudo-PPK authentication information associated with the network device; generate, using a non-quantum-secure key, non-quantum-secure authentication information associated with the network device; and send an authentication message that includes the pseudo-PPK authentication information and the non-quantum-secure authentication information.

BRIEF DESCRIPTION OF THE DRAWINGS

FIG. 5 is a flowchart of an example process associated with facilitating establishment of an SA when a PPK cannot be obtained.

DETAILED DESCRIPTION

Figure 1A:
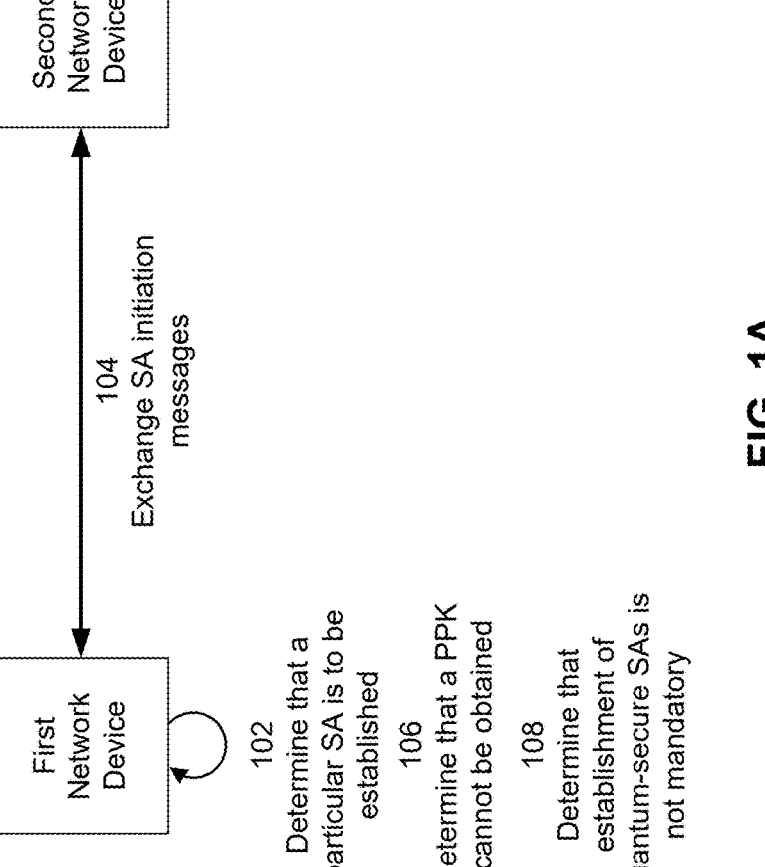
FIGS. 1A-1D are diagrams of an example implementation associated with facilitating establishment of an SA when a PPK cannot be obtained.

The following detailed description of example implementations refers to the accompanying drawings. The same reference numbers in different drawings may identify the same or similar elements.

The Internet Engineering Task Force (IETF) Request for Comment (RFC) 8784 describes a procedure to negotiate and establish quantum-secure SAs between network devices by extending IKEv2. Per RFC 8784, each network device is configured with (and maintains) information (e.g., a flag, or other another type of information) that indicates whether establishment of quantum-secure SAs are mandatory for the network device. That is, the information indicates whether the network device needs to use a PPK as part of the process to establish an SA with another network device.

In some cases, an initiator network device and a responder network device can exchange SA initiation messages (e.g., according to the extended IKEv2, as described in RFC 8784) to initiate establishment of a quantum-secure SA. The initiator network device then attempts to obtain a PPK (e.g., from a data structure, such as a key management entity (KME)), but can encounter an issue (e.g., a communication issue, a key corruption issue, or another type of issue) that prevents the PPK from being obtained by the initiator network device. The initiator network device is therefore unable to provide, to the responder network device, an authentication message (e.g., an IKE_AUTH message) that includes quantum-secure information (e.g., that would otherwise be generated using the PPK) for authenticating the initiator network device. This results in the quantum-secure SA not being established between the initiator network device and the responder network device.

Consequently, because the responder network device never receives the authentication message (and does not receive any information indicating that the initiator network device failed to obtain the PPK), the responder network device consumes computing resources (e.g., processing resources, memory resources, communication resources, and/or power resources, among other examples) to indefinitely maintain information related to the incompletely established quantum-secure SA. At scale (e.g., when hundreds, thousands, or more, incompletely established quantum-secure SAs are maintained), this can impact a perfor-
mance (e.g., a networking performance) of the responder
network device. Additionally, when the initiator network
device continues to encounter PPK retrieval errors as part of
additional attempts to establish a quantum-secure SA with
the responder network device, the initiator network device
and the responder network device can continue to waste
computing resources (e.g., processing resources, memory
resources, communication resources, and/or power
resources, among other examples) by incompletely estab-
lishing a quantum-secure SA each time establishing a quan-
tum-secure SA is attempted.

Further, in some cases, establishment of quantum-secure
SAs are optional for both the initiator network device and
the responder network device, but the network devices are
not configured to automatically attempt establishment of a
non-quantum-secure SA upon a PPK retrieval-related error
encountered by the initiator network device. This prevents
any type of SA being established between the initiator
network device and the responder network device, even
when establishment of a non-quantum-secure SA would
otherwise be feasible.

Some implementations described herein include a first
network device (e.g., an initiator network device) and a
second network device (e.g., a responder network device).
The first network device and the second network device
exchange SA initiation messages to initiate establishment of
a particular SA between the first network device and the
second network device. Additionally, in an attempt to obtain
information that can be used to establish the particular SA as
a quantum-secure SA, the first network device attempts to,
but fails to, retrieve a PPK (e.g., from a data structure, such
as a KME). The first network device thus determines that the
PPK cannot be obtained by the network device. Notably, the
first network device also determines (e.g., based on a flag)
that establishment of quantum-secure SAs is not mandatory
for the first network device. Accordingly, the first network
device generates additional information to facilitate estab-
lishing the particular SA as a non-quantum-secure SA, as
further described herein.

For example, the first network device generates a pseudo-
PPK (e.g., that is not an actual PPK) and a pseudo-PPK
identifier (e.g., that is not an actual PPK identifier). The first
network device then uses the pseudo-PPK to generate
pseudo-PPK authentication associated with the first network
device. Additionally, the first network device generates,
using a non-quantum-secure key, non-quantum-secure
authentication information associated with the network
device. The first network device then generates an authen-
tication message (e.g., that is the same as, or similar to, an
IKE_AUTH message defined by RFC 8784) that is to be
provided to the second network device. The authentication
message includes the pseudo-PPK identifier, the pseudo-
PPK authentication information, and the non-quantum-se-
cure authentication information. In this way, the first net-
work device generates an authentication message that
includes first authentication information that appears to be
PPK authentication information (but is not) and second
authentication information that is non-quantum-secure
authentication information. Therefore, the first network
device may provide the authentication message (as further
described herein) to the second network device so as to
continue facilitating establishment of the particular SA (as
further described herein).

Accordingly, the first network device sends the authenti-
cation message to the second network device. The second
network device then authenticates the first network device, such as by, first, failing to authenticate the first network
device based on the pseudo-PPK identifier and/or the
pseudo-PPK authentication information (e.g., because this
PPK information is not actual PPK information), and then
by, second, authenticating the first network device based on
the non-quantum-secure authentication information. Nota-
bly, the second network device authenticates the first net-
work device based on the non-quantum-secure authentica-
tion information only when the second network device is
also configured with information (e.g., a flag) that indicates
that establishment of quantum-secure SAs is not mandatory
for the second network device.

In this way, the first network device, by including pseudo-
PPK information in the authentication message, allows for
the particular SA to be established as a non-quantum-secure
SA (without a new SA establishment process to be initiated)
when both the first network device and the second network
device allow non-quantum-secure SAs. This would not
otherwise be possible using the procedures defined by RFC
8784. However, implementations described herein are
interoperable with existing RFC 8784 infrastructure (and
therefore a hardware modification is not needed for the first
network device or the second network device to perform any
operation described herein).

Further, because the pseudo-PPK information is included
in the authentication message, the second network device is
able to authenticate the first network device based on the
non-quantum-secure authentication information, even
though the first network device failed to obtain a PPK.
Accordingly, some implementations described herein reduce
a likelihood that incompletely established quantum-secure
SAs are maintained by the second network device (e.g., the
receiver network device), and therefore some implementa-
tions described herein conserve computing resources (e.g.,
processing resources, memory resources, communication
resources, and/or power resources, among other examples)
that would otherwise be used by the second network device
to indefinitely maintain information related to incompletely
established quantum-secure SAs. This reduction in wasted
computing resources therefore improves a performance
(e.g., a networking performance) of the second network
device. Further, the first network device and the second
network device do not need to perform additional attempts
to establish an SA, so additional computing resources of
both network devices are also conserved.

FIGS. 1A-1D are diagrams of an example implementation
100 associated with facilitating establishment of an SA when
a PPK cannot be obtained. As shown in FIGS. 1A-1D,
example implementation 100 includes a first network device
and a second network device. These devices are described in
more detail below in connection with FIGS. 2-4. The first
network device may be an initiator network device and the
second network device may be a responder network device,
which are to communicate to cause establishment of an SA,
as further described herein.

As shown in FIG. 1A, and by reference number 102, the
first network device may determine that a particular SA is to
be established with a peer network device, such as the
second network device. For example, the first network
device may determine that the first network device is to
communicate with the second network device, and that any
communication between the first network device and the
second network device is to be a secure communication. In
some implementations, the first network device may deter-
mine that the SA is to be a quantum-secure SA, or, option-
ally, a non-quantum-secure SA. Accordingly, one or more of
the other operations described herein in relation to FIGS.

1A-1D may be performed by the first the network device and/or the second network device.

As shown by reference number 104, the first network device and the second network device may exchange SA initiation messages (e.g., to facilitate establishment of a particular SA). For example, the first network device may send, and the second network device may receive, an SA initiation request message (e.g., an IKE_INIT message, an IKE_SA_INIT message, or a similar message) that indicates a request to initiate establishment of the particular SA between the first network device and the second network device. The SA initiation request message may include a notification (e.g., that is the same as, or similar to, a USE_PPK notification defined by RFC 8784) that indicates that the first network device is configured to use a PPK with the second network device to establish the particular SA. Further, the second network device (e.g., after receiving the SA initiation request message) may send, and the first network device may receive, an SA initiation response message (e.g., an IKE_INIT message, an IKE_SA_INIT message, or a similar message) that indicates a response to and/or approval to initiate establishment of the particular SA. The SA initiation response message may include a notification (e.g., that is the same as, or similar to, a USE_PPK notification defined by RFC 8784) that indicates that the second network device is configured to use a PPK with the first network device to establish the particular SA.

As shown by reference number 106, the first network device may determine that a PPK cannot be obtained by the first network device (e.g., based on determining that the particular SA is to be established and/or based on exchanging the SA initiation messages). For example, the first network device may cause a process to be initiated for the first network device to retrieve the PPK from a data structure (e.g., a KME, or another type of data structure). Due to a communication issue with the data structure, a corruption issue associated with the PPK, or another issue, the first network device may not be able to retrieve the PPK. Accordingly, the first network device may determine that an error occurred when the first network device attempted to retrieve the PPK from the data structure and may thus determine that the PPK cannot be obtained by the network device.

As shown by reference number 108, the first network device may determine that establishment of a quantum-secure SA is not mandatory for the first network device (e.g., based on determining that a PPK cannot be obtained by the first network device). For example, the first network device may determine that the first network device is configured with information that indicates that establishment of quantum-secure SAs is not mandatory for the first network device. As a specific example, the first network device may determine that a flag (e.g., that is the same as, or similar to, a "mandatory_or_not" flag defined by RFC 8784) indicates that establishment of quantum-secure SAs is not mandatory for the first network device.

Figure 1B:
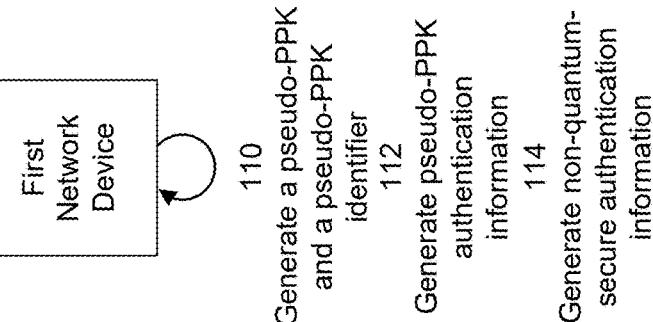

As shown in FIG. 1B, and by reference number 110, the first network device may generate a pseudo-PPK and a pseudo-PPK identifier (e.g., based on determining that the PPK cannot be obtained by the first network device and based on determining that establishment of quantum-secure SAs is not mandatory for the first network device). The pseudo-PPK and the pseudo-PPK identifier may be formatted in a similar manner as the PPK and a PPK_ID, respectively, defined by RFC 8784. For example, the pseudo-PPK and the pseudo-PPK identifier may each have a length that is greater than or equal to 256 bits (e.g., to ensure, or at least to appear to ensure, at least 256 bits of entropy). Notably, the pseudo-PPK may not be an actual PPK (e.g., as defined by RFC 8784), and may include "dummy" or "random" bits, and, accordingly, the pseudo-PPK identifier may not be an actual PPK-ID (e.g., as defined by RFC 8784) and may also include dummy or random bits.

As shown by reference number 112, the first network device may generate pseudo-PPK authentication information associated with the first network device. In some implementations, the first network device may use the pseudo-PPK to generate the pseudo-PPK authentication information. For example, the first network device may hash (e.g., using a cryptographic hash algorithm, such as a hash-based message authentication code (HMAC) algorithm) the pseudo-PPK and other information (e.g., that was shared as part of the exchange of SA initiation messages described herein in relation to FIG. 1A and reference number 106) to produce the pseudo-PPK authentication information. Accordingly, the pseudo-PPK authentication information may be similar to, and may be similarly generated as, the AUTH data defined by RFC 8784.

As shown by reference number 114, the first network device may generate non-quantum-secure authentication information. In some implementations, the first network device may use a non-quantum-secure key (e.g., a cryptographic key that is not a PPK) to generate the non-quantum-secure authentication information. For example, the first network device may encrypt (e.g., using an encryption algorithm, such as a Rivest-Shamir-Adleman (RSA) encryption algorithm) other information (e.g., that was shared as part of the exchange of SA initiation messages described herein in relation to FIG. 1A and reference number 106) using a non-quantum-secure key (e.g., a symmetric key generated based on a shared secret generated by exchanging Diffie-Hellman public keys, such as in the SA initiation messages described herein) to produce the non-quantum-secure authentication information. Accordingly, non-quantum-secure authentication information may be similar to, and may be similarly generated as, the NO_PPK_AUTH data defined by RFC 8784.

Figure 1C:
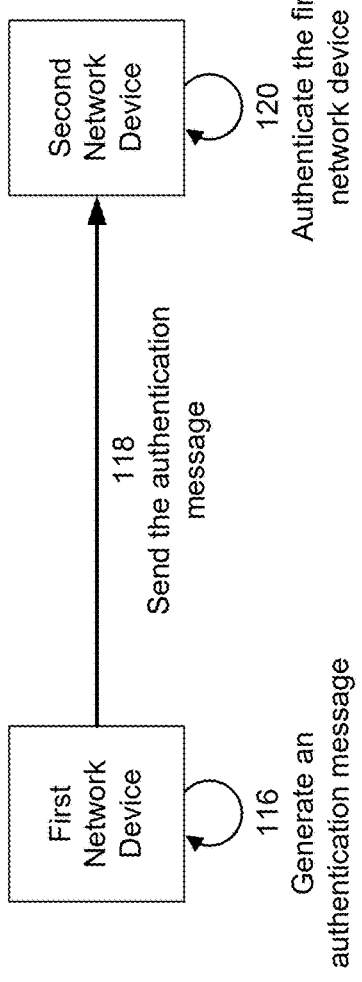

As shown in FIG. 1C, and by reference number 116, the first network device may generate an authentication message. The authentication message may be, for example, an IKEv2 authentication request message (e.g., an IKE_AUTH message or a similar message). In some implementations, the authentication message may include, for example, the pseudo-PPK identifier, the pseudo-PPK authentication information, and/or the non-quantum-secure authentication information. For example, the authentication message may include the pseudo-PPK identifier and the pseudo-PPK authentication information in a first portion (e.g., a required portion) of the authentication message, and may include the non-quantum-secure authentication information in a second portion (e.g., an optional portion) of the authentication message. In a specific example, the authentication message may the same as, or similar to, an IKE_AUTH message as defined by RFC 8784, and may include the pseudo-PPK authentication information in a first location (e.g., a first location in which AUTH data would otherwise be located), the pseudo-PPK identifier in a second location (e.g., a second location in which a PPK_ID would otherwise be located), and the non-quantum-secure authentication information in a third location (e.g., a third location in which NO_PPK_AUTH data would otherwise be located) within the authentication message.

In this way, the first network device may generate an authentication message that includes first authentication information that appears to be PPK authentication information (but is not) and second authentication information that is non-quantum-secure authentication information. Accordingly, the first network device may provide the authentication message (as further described herein) to the second network device so as to continue facilitating establishment of the particular SA (as further described herein). Notably, the first network device may generate the pseudo-PPK, the pseudo-PPK identifier, the pseudo-PPK authentication information, the non-quantum-secure authentication information, and the authentication message (as described herein) only based on determining that that establishment of quantum-secure SAs is not mandatory for the first network device and on determining that that the PPK cannot be obtained by the first network device. In this way, the first network device ensures that an authentication message is generated that is formatted in a manner that the second network device expects (e.g., based on exchanging the SA initiation messages, as described herein).

As shown by reference number 118, the first network device may send, and the second network device may receive, the authentication message. As shown by reference number 120, the second network device may authenticate the first network device. This may include first failing to authenticate the first network device based on the pseudo-PPK identifier and/or the pseudo-PPK authentication information. For example, the second network device may try to use the pseudo-PPK identifier in the authentication message to retrieve a PPK (e.g. from a data structure), and may thereby fail to obtain a PPK (e.g., because the pseudo-PPK is not associated with an actual PPK). As another example, the second network device may successfully obtain a PPK (e.g., an incorrect PPK) based on the pseudo-PPK identifier, but may fail to authenticate the pseudo-PPK authentication information using the obtained PPK (e.g., because the pseudo-PPK authentication information was not generated using the obtained PPK). Accordingly, the second network device may perform one or more additional operations (e.g., after failing to authenticate the first network device based on the pseudo-PPK identifier and/or the pseudo-PPK authentication information).

The one or more operations may include determining that establishment of a quantum-secure SA is not mandatory for the second network device (e.g., in a similar manner as that described herein in relation to FIG. 1A and reference number 102). For example, the second network device may determine that the second network device is configured with information that indicates that establishment of quantum-secure SAs is not mandatory for the second network device. As a specific example, the second network device may determine that a flag (e.g., that is the same as, or similar to, a "mandatory_or_not" flag defined by RFC 8784) indicates that establishment of quantum-secure SAs is not mandatory for the second network device.

Accordingly, the one or more operations may also include the second network device identifying the non-quantum-secure authentication information in the authentication message and the second network device authenticating the first network device based on the non-quantum-secure authentication information. For example, the second network device may decrypt (e.g., using the encryption algorithm described above) the non-quantum-secure authentication information using another non-quantum-secure key (e.g., another symmetric key generated based on a shared secret generated by exchanging Diffie-Hellman public keys, such as in the SA initiation messages described herein) to produce decrypted information, and the second network device then may determine whether the decrypted information matches (e.g., is the same as) other information (e.g., that was shared as part of the exchange of SA initiation messages described herein in relation to FIG. 1A and reference number 106). In some implementations, the second network device may authenticate the first network device based on the non-quantum-secure authentication information in a similar manner as that described by RFC 8784.

Figure 1D:
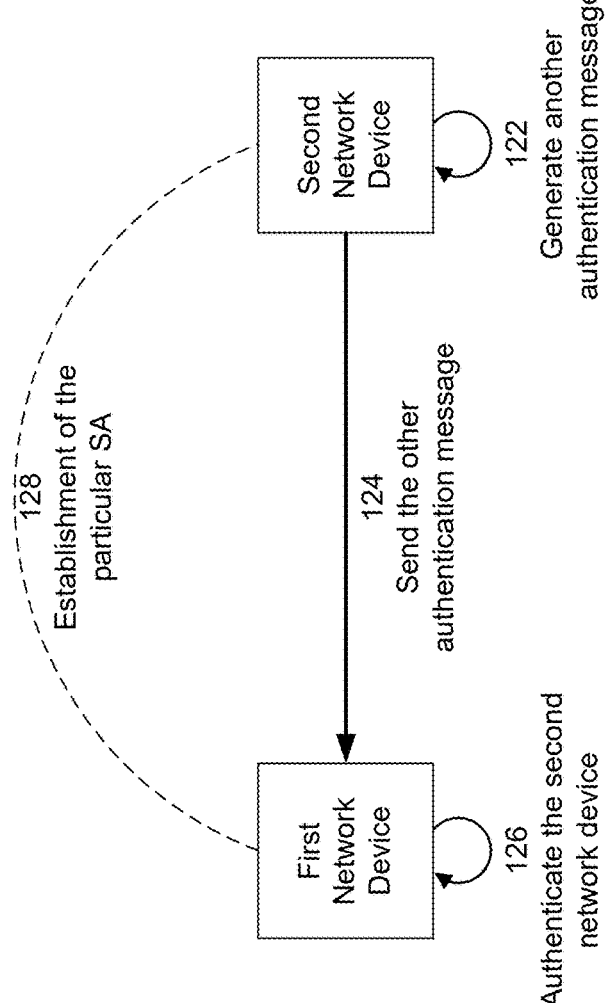
Figure 1D:

As shown in FIG. 1D, and by reference number 122, the second network device may generate another authentication message. The authentication message may be, for example, an IKEv2 authentication response message (e.g., an IKE-_AUTH message or a similar message). In some implementations, the authentication message may include, for example, other non-quantum-secure authentication information associated with the second network device. The other non-quantum-secure authentication information may have been generated by the second network device encrypting (e.g., using the encryption algorithm described herein) other information (e.g., that was shared as part of the exchange of SA initiation messages described herein in relation to FIG. 1A and reference number 106) using the other non-quantum-secure key (e.g., the other symmetric key described above).

As shown by reference number 124, the second network device may send, and the first network device may receive, the other authentication message. As shown by reference number 126, the first network device may authenticate the second network device. For example, the first network device may decrypt (e.g., using the encryption algorithm described above) the other non-quantum-secure authentication information included in the other authentication message using the non-quantum-secure key (e.g., the symmetric key described above) to produce decrypted information, and the first network device then may determine whether the decrypted information matches (e.g., is the same as) other information (e.g., that was shared as part of the exchange of SA initiation messages described herein in relation to FIG. 1A and reference number 106). In some implementations, the first network device may authenticate the second network device based on the other non-quantum-secure authentication information in a similar manner as that described by RFC 8784.

Accordingly, as shown by reference number 128, the particular SA may be established. For example, because the second network device authenticated the first network device and because the first network device authenticated the second network device, the particular SA may be established. In this way, the first network device may generate the pseudo-PPK, the pseudo-PPK identifier, the pseudo-PPK authentication information, the non-quantum-secure authentication information, and the authentication message (as described herein) to facilitate establishment of the particular SA (e.g., based on determining that that establishment of quantum-secure SAs is not mandatory for the first network device and based on determining that that the PPK cannot be obtained by the first network device).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a first network device 210, a second network device 220, and a network 230. Devices of environment 200 may interconnect via wired connections, wireless connections, or a combination of wired and wireless connections.

First network device 210 includes one or more devices capable of receiving, processing, storing, routing, and/or providing information in a manner described herein. For example, first network device 210 may include a router, such as a label switching router (LSR), a label edge router (LER), an ingress router, an egress router, a provider router (e.g., a provider edge router, a provider core router, etc.), a virtual router, or another type of router. Additionally, or alternatively, first network device 210 may include a gateway, a switch, a firewall, a hub, a bridge, a reverse proxy, a server (e.g., a proxy server, a cloud server, a data center server, etc.), a load balancer, and/or a similar device. First network device 210 may be an initiator network device associated with establishing an SA.

Second network device 220 includes one or more devices capable of receiving, processing, storing, routing, and/or providing information in a manner described herein. For example, second network device 220 may include a router, such as an LSR, an LER, an ingress router, an egress router, a provider router, a virtual router, or another type of router. Additionally, or alternatively, second network device 220 may include a gateway, a switch, a firewall, a hub, a bridge, a reverse proxy, a server, a load balancer, and/or a similar device. Second network device 220 may be a responder network device associated with establishing an SA.

Network 230 includes one or more wired and/or wireless networks. For example, network 230 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
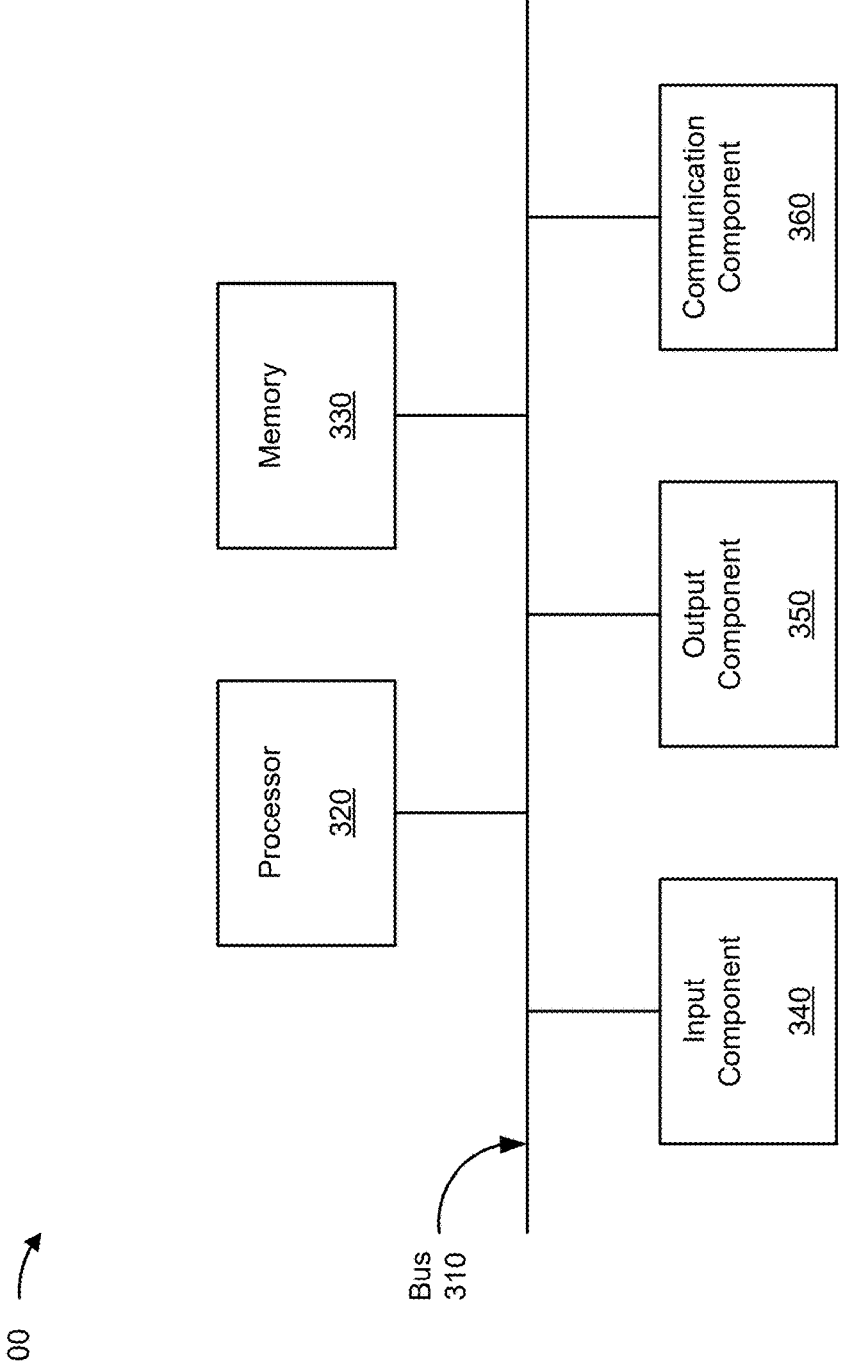
FIG. 3 is a diagram of example components of a device associated with facilitating establishment of an SA when a PPK cannot be obtained.

FIG. 3 is a diagram of example components of a device 300 associated with facilitating establishment of an SA when a PPK cannot be obtained. The device 300 may correspond to first network device 210 and/or second network device 220. In some implementations, first network device 210 and/or second network device 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
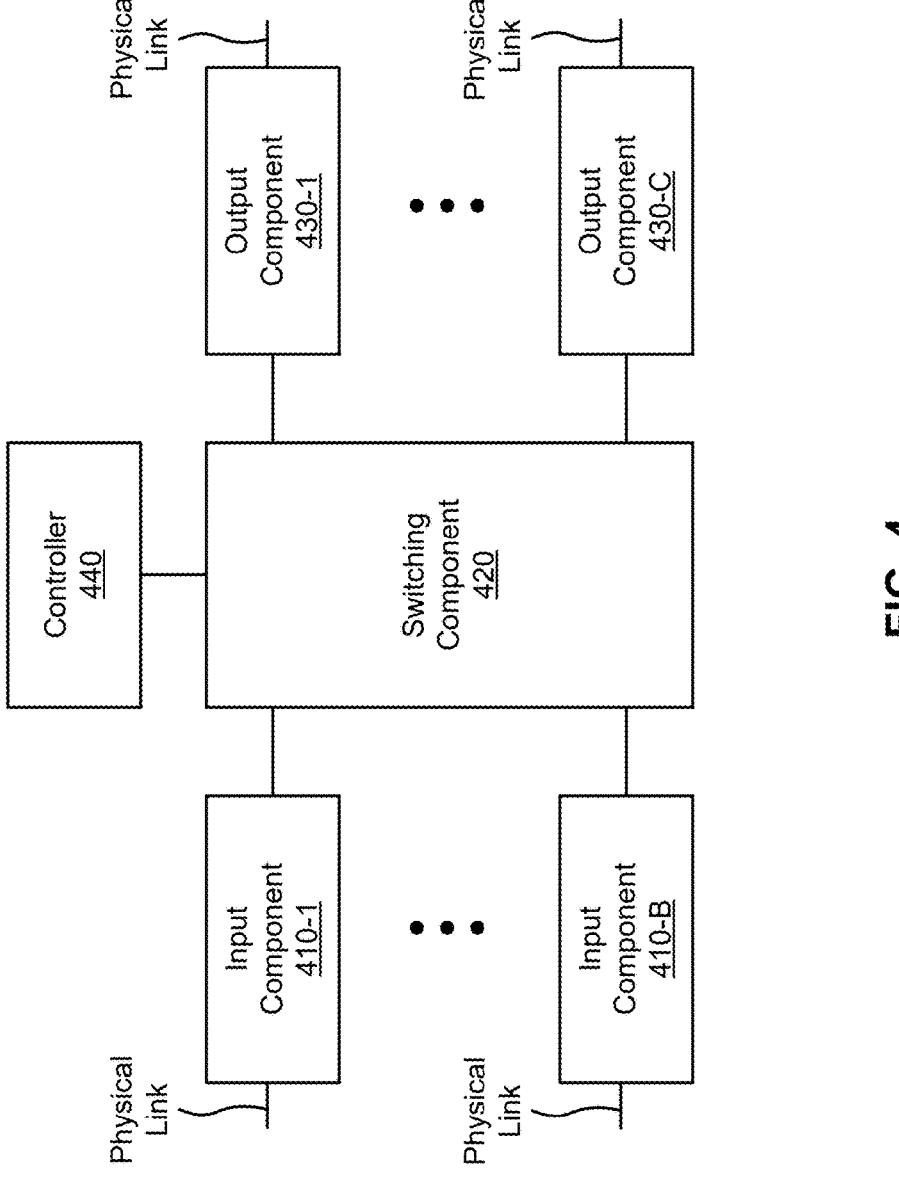
FIG. 4 is a diagram of example components of a device associated with facilitating establishment of an SA when a PPK cannot be obtained.

FIG. 4 is a diagram of example components of a device 400 associated with facilitating establishment of an SA when a PPK cannot be obtained. Device 400 may correspond to first network device 210 and/or second network device 220. In some implementations, first network device 210 and/or second network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with facilitating establishment of an SA when a PPK cannot be obtained. In some implementations, one or more process blocks of FIG. 5 are performed by a network device (e.g., first network device 210). In some implementations, one or more process blocks of FIG. 5 are performed by another device or a group of devices separate from or including the network device, such as a peer network device (e.g., second network device 220). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more other components.

As further shown in FIG. 5, process 500 may include determining that a particular SA is to be established with a peer network device (block 510). For example, the network device may determine that a particular SA is to be established with a peer network device, as described above.

As further shown in FIG. 5, process 500 may include determining that a PPK cannot be obtained by the network device (block 520). For example, the network device may determine, based on determining that the particular SA is to be established, that a PPK cannot be obtained by the network device, as described above.

As shown in FIG. 5, process 500 may include determining that establishment of quantum-secure SAs is not mandatory for the network device (block 530). For example, the network device may determine that establishment of quantum-secure SAs is not mandatory for the network device, as described above.

As further shown in FIG. 5, process 500 may include generating a pseudo-PPK and a pseudo-PPK identifier (block 540). For example, the network device may generate based on determining that the PPK cannot be obtained by the network device, and based on determining that establishment of quantum-secure SAs is not mandatory for the network device, a pseudo-PPK and a pseudo-PPK identifier, as described above.

As further shown in FIG. 5, process 500 may include generating, using the pseudo-PPK, pseudo-PPK authentication information associated with the network device (block 550). For example, the network device may generate, using the pseudo-PPK, pseudo-PPK authentication information associated with the network device, as described above.

As further shown in FIG. 5, process 500 may include generating, using a non-quantum-secure key, non-quantum-secure authentication information associated with the network device (block 560). For example, the network device may generate, using a non-quantum-secure key, non-quantum-secure authentication information associated with the network device, as described above.

As further shown in FIG. 5, process 500 may include generating an authentication message that includes the pseudo-PPK identifier, the pseudo-PPK authentication information, and the non-quantum-secure authentication information (block 570). For example, the network device may generate an authentication message that includes the pseudo-PPK identifier, the pseudo-PPK authentication information, and the non-quantum-secure authentication information, as described above.

As further shown in FIG. 5, process 500 may include sending the authentication message to the peer network device (block 580). For example, the network device may send the authentication message to the peer network device, as described above.

Process 500 may include additional implementations, such as any single implementation or any combination of implementations described below and/or in connection with one or more other processes described elsewhere herein.

In a first implementation, determining that establishment of quantum-secure SAs is not mandatory for the network device comprises determining that a flag, maintained by the network device, indicates that establishment of quantum-secure SAs is not mandatory for the network device.

In a second implementation, alone or in combination with the first implementation, determining that the PPK cannot be obtained by the network device comprises causing a process to be initiated for the network device to retrieve the PPK from a data structure; determining, based on causing the process to be initiated, that an error occurred when the network device attempted to retrieve the PPK from the data structure; and determining, based on determining that the error occurred, that the PPK cannot be obtained by the network device.

In a third implementation, alone or in combination with one or more of the first and second implementations, the pseudo-PPK and the pseudo-PPK identifier each have a length that is greater than or equal to 256 bits.

In a fourth implementation, alone or in combination with one or more of the first through third implementations, the authentication message is an IKEv2 authentication request message.

In a fifth implementation, alone or in combination with one or more of the first through fourth implementations, the authentication message includes the pseudo-PPK identifier and the pseudo-PPK authentication information in a required portion of the authentication message, and includes the non-quantum-secure authentication information in an optional portion of the authentication message.

In a sixth implementation, alone or in combination with one or more of the first through fifth implementations, sending the authentication message to the peer network device allows the peer network device to authenticate the network device based on the non-quantum-secure authentication information.

In a seventh implementation, alone or in combination with one or more of the first through sixth implementations, process 500 includes receiving, from the peer network device and after sending the authentication message, another authentication message that includes other non-quantum-secure authentication information associated with the peer network device.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a network device, that a particular security association (SA) is to be established with a peer network device;
    determining, by the network device and based on determining that the particular SA is to be established, that a post-quantum preshared key (PPK) cannot be obtained by the network device;
    determining, by the network device, that establishment of quantum-secure SAs is not mandatory for the network device;
    generating, by the network device, based on determining that the PPK cannot be obtained by the network device, and based on determining that establishment of quantum-secure SAs is not mandatory for the network device, a pseudo-PPK and a pseudo-PPK identifier;
    generating, by the network device and using the pseudo-PPK, pseudo-PPK authentication information associated with the network device;
    generating, by the network device and using a non-quantum-secure key, non-quantum-secure authentication information associated with the network device;
    generating, by the network device, an authentication message that includes the pseudo-PPK identifier, the pseudo-PPK authentication information, and the non-quantum-secure authentication information; and
    sending, by the network device, the authentication message to the peer network device.

2. The method of claim 1, wherein determining that establishment of quantum-secure SAs is not mandatory for the network device comprises:
    determining that a flag, maintained by the network device, indicates that establishment of quantum-secure SAs is not mandatory for the network device.

3. The method of claim 1, wherein determining that the PPK cannot be obtained by the network device comprises:
    causing a process to be initiated for the network device to retrieve the PPK from a data structure;
    determining, based on causing the process to be initiated, that an error occurred when the network device attempted to retrieve the PPK from the data structure; and
    determining, based on determining that the error occurred, that the PPK cannot be obtained by the network device.

4. The method of claim 1, wherein the pseudo-PPK and the pseudo-PPK identifier each have a length that is greater than or equal to 256 bits.

5. The method of claim 1, wherein the authentication message is an Internet key exchange protocol version 2 (IKEv2) authentication request message.

6. The method of claim 1, wherein the authentication message includes the pseudo-PPK identifier and the pseudo-PPK authentication information in a required portion of the authentication message, and includes the non-quantum-secure authentication information in an optional portion of the authentication message.

7. The method of claim 1, wherein sending the authentication message to the peer network device allows the peer network device to authenticate the network device based on the non-quantum-secure authentication information.

8. The method of claim 1, further comprising:
    receiving, from the peer network device and after sending the authentication message, another authentication message that includes other non-quantum-secure authentication information associated with the peer network device.

9. A non-transitory computer-readable medium storing a set of instructions, the set of instructions comprising:

one or more instructions that, when executed by one or more processors of a network device, cause the network device to:

determine that establishment of quantum-secure security associations (SAs) is not mandatory for the network device;

determine, based on determining particular SA is to be established with a peer network device, that a post-quantum preshared key (PPK) cannot be obtained by the network device;

generate, based on determining that the PPK cannot be obtained by the network device, and based on determining that establishment of quantum-secures SAs is not mandatory for the network device, a pseudo-PPK and a pseudo-PPK identifier;

generate, using the pseudo-PPK, pseudo-PPK authentication information associated with the network device;

generate, using a non-quantum-secure key, non-quantum-secure authentication information associated with the network device; and send, to the peer network device, an authentication message that includes the pseudo-PPK identifier, the pseudo-PPK authentication information, and the non-quantum-secure authentication information.

10. The non-transitory computer-readable medium of claim 9, wherein the one or more instructions, that cause the network device to determine that establishment of quantum-secure SAs is not mandatory for the network device, cause the network device to:

determine that the network device is configured with information that indicates that establishment of quantum-secure SAs is not mandatory for the network device.

11. The non-transitory computer-readable medium of claim 9, wherein the one or more instructions, that cause the network device to determine that the PPK cannot be obtained by the network device, cause the network device to:

determine that an error occurred when the network device attempted to retrieve the PPK from a data structure; and determine, based on determining that the error occurred, that the PPK cannot be obtained by the network device.

12. The non-transitory computer-readable medium of claim 9, wherein the pseudo-PPK and the pseudo-PPK identifier each have a length that is greater than or equal to 256 bits.

13. The non-transitory computer-readable medium of claim 9, wherein the authentication message includes the pseudo-PPK identifier and the pseudo-PPK authentication information in a first portion of the authentication message, and includes the non-quantum-secure authentication information in a second portion of the authentication message.

14. The non-transitory computer-readable medium of claim 9, wherein sending the authentication message to the peer network device allows the peer network device to authenticate the network device based on the non-quantum-secure authentication information.

15. The non-transitory computer-readable medium of claim 9, wherein the one or more instructions further cause the network device to:

receive, from the peer network device and after sending the authentication message, another authentication message that includes other non-quantum-secure authentication information associated with the peer network device.

16. A network device, comprising:

one or more memories; and one or more processors to:

determine that a post-quantum preshared key (PPK) cannot be obtained by the network device;

generate, based on determining that the PPK cannot be obtained by the network device, a pseudo-PPK;

generate, using the pseudo-PPK, pseudo-PPK authentication information associated with the network device;

generate, using a non-quantum-secure key, non-quantum-secure authentication information associated with the network device; and send an authentication message that includes the pseudo-PPK authentication information and the non-quantum-secure authentication information.

17. The network device of claim 16, wherein the one or more processors, to determine that establishment of quantum-secure security associations (SAs) is not mandatory for the network device, are to:

determine that a flag, maintained by the network device, indicates that establishment of quantum-secure SAs is not mandatory for the network device.

18. The network device of claim 16, wherein the one or more processors, to determine that the PPK cannot be obtained by the network device, are to:

determine, based on an error associated with the network device attempting to retrieve the PPK from a data structure, that the PPK cannot be obtained by the network device.

19. The network device of claim 16, wherein the authentication message includes the pseudo-PPK authentication information in a first portion of the authentication message, and includes the non-quantum-secure authentication information in a second portion of the authentication message.

20. The network device of claim 16, wherein sending the authentication message allows for authentication of the network device using the non-quantum-secure authentication information.

* * * * *